Dec. 7, 1937. A. SANDUL 2,101,600
AUTOMATIC TRAILER BRAKE APPLIANCE
Filed Feb. 18, 1937 2 Sheets-Sheet 2
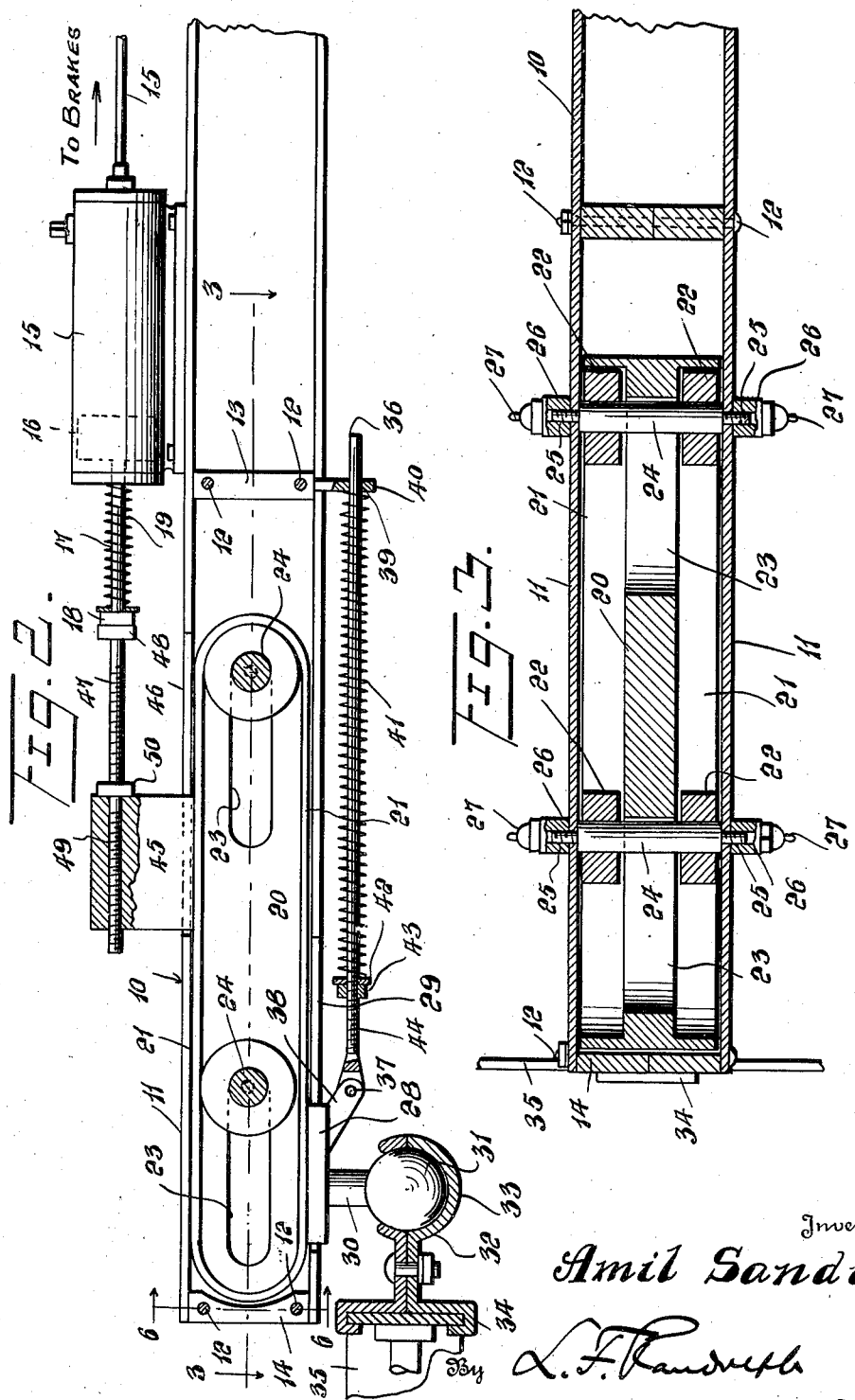
Inventor
Amil Sandul
By L. F. Randulph
Attorney Patented Dec. 7, 1937

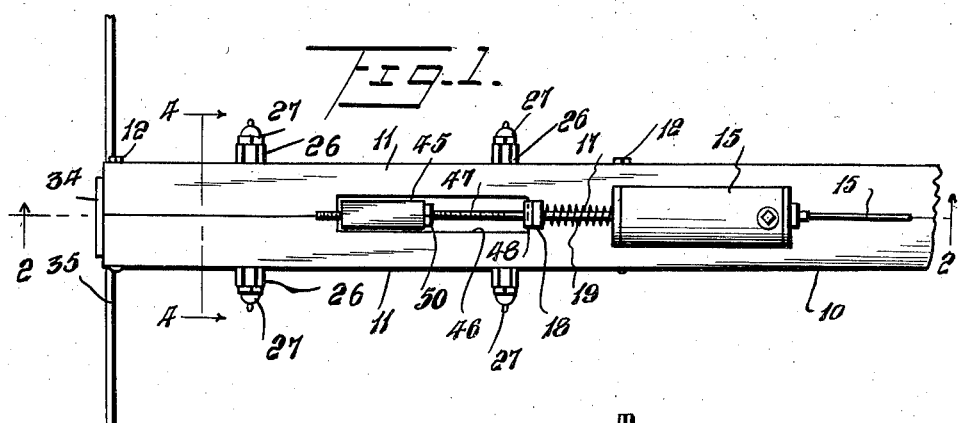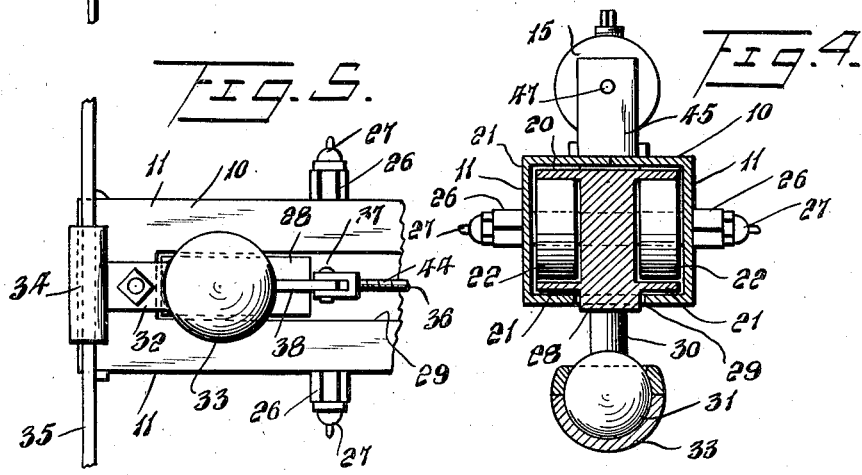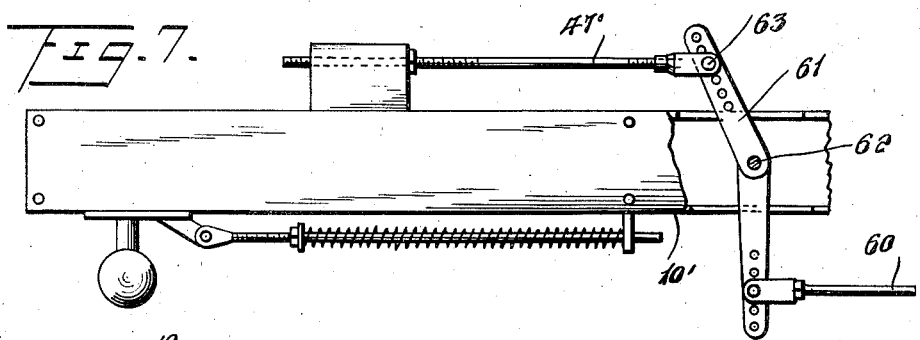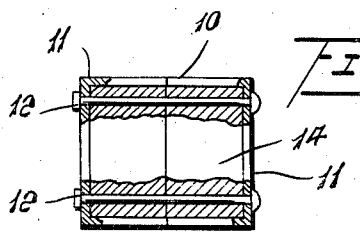

2,101,600

UNITED STATES PATENT OFFICE 2,101,600

AUTOMATIC TRAILER BRAKE APPLIANCE

Amil Sandul, Humboldt, Minn., assignor of one-half to Phil Baldwin, Humboldt, Minn.

Application February 18, 1937, Serial No. 126,465

3 Claims. (Cl. 188—142)

This invention relates to an automatic brake appliance and safety device designed for use on wheeled trailers, regardless of whether they have two or more wheels, and usually of the type pulled by an automobile, and for instance a house trailer.

It is particularly aimed to provide a construction which will utilize the arrested motion of the automobile or other draft vehicle when the brakes thereof are applied, and the resultant push of the trailer, as the means for applying the necessary braking pressure on the brakes of the trailer. The invention is capable of use in connection with the so-called hydraulic braking systems now in use on automobiles but is also adapted for use with mechanical or other types of automobile brakes.

The more specific objects and advantages will become apparent from a consideration of the description following taken in connection with accompanying drawings illustrating an operative embodiment.

In said drawings:

Figure 1 is a plan view of the appliance;

Figure 2 is an enlarged longitudinal sectional view taken on the line 2—2 of Figure 1;

Figure 3 is a horizontal sectional view taken on the line 3—3 of Figure 2;

Figure 4 is a cross sectional view taken on the line 4—4 of Figure 1;

Figure 5 is a partial bottom plan view of the device;

Figure 6 is a detail primarily in section showing the attachment of the device to an automobile bumper and Figure 7 is a side elevation of a modified form of the invention.

Referring specifically to the drawings and first to the form of Figures 1 to 6, a hollow draft tongue or body is provided at 10 preferably made up of two beams 11 of U-shape in cross section, with their flanges horizontal and facing each other as best shown in Figure 4, the same being connected together by means of bolts as at 12 and blocks 13 and 14, through which they pass. Said tongue 10 at the rear or right hand end shown in the drawings, is adapted for fastening in any suitable manner to the trailer and mounted on the tongue is an hydraulic cylinder 15 from which a pipe leads to the brake mechanism of the wheels of such trailer. The cylinder 15 has a piston 16 operable therein to displace the hydraulic fluid to apply the brakes and from the piston a rod 17 extends exteriorly of the cylinder equipped with a head 18 and an expansive coil spring 19 surrounds the rod abutting the head at one end and the adjacent end of the cylinder 15 at the other.

A mobile body 20 is disposed for sliding movement longitudinally of the tongue and as best seen in Figure 4, is H-shaped in cross section, having continuous laterally extending flanges at 21 which engage and travel on rollers 22, thereby reducing friction to a minimum. Said body 20 has elongated slots 23 therethrough, through which extend axles or shafts 24 that have reduced ends 25, on which nuts 26 are threaded exteriorly of the tongue. Any suitable lubricating system may be employed, preferably utilizing fittings 27 attached to the nuts. The aforesaid wheels 22 are journaled on the shafts 24.

Said body 20 has a guide block 28 integral with it which slides in an elongated slot 29 provided in the lower flanges of the beams 11. Depending from the block 28 is a stem 30 carrying a ball 31. A clamp 32 has a socket 33 detachably engaging the ball 31 and a portion 34 which is rigidly clamped to the bumper 35 of the automobile or other pulling or propelling vehicle.

A rod 36, parallel to the tongue is disposed beneath the same, being pivotally connected at 37 to a lug 38 extending from the block 28. The other end of the rod 36 freely slides through an opening 39 in a lug 40 depending from the block 13. An expansive coil spring 41 surrounds the rod 36, abutting the lug 40 and an abutment 42 on the rod, which is adjustable through the medium of a nut 43 engaging screw threads 44 on the rod.

A stud or projection 45 rises from the body 20 through an elongated slot 46 provided in the upper flanges of the beams 11. A push rod 47 having a head 48, in engagement with the head 18, is adjustably carried by the stud 45. The rod 47 is screw threaded as at 49, to the stud 45 and in its adjusted position may be locked by means of a nut 50, abutting the stud.

In the operation of the invention, when the automobile or draft vehicle having the bumper 35 thereon stops, or the brakes are applied, the hesitation or sudden stoppage results in relative movement of the body 20 within the tongue, which causes the push rod 47 to displace the piston 16, thereby momentarily or otherwise applying the brakes of the trailing vehicle. The action of the draft vehicle augmented by the spring 41 will normally maintain the body 20 in its forward position. The spring 41 absorbs some of the surplus motion incident to varying weights and speed and also prevents play between the parts. This spring 41 will also enable the trailer to be backed behind the automobile or draft vehicle.

Various changes may be resorted to provided they fall within the spirit and scope of the invention. For instance the form of Figure 7 may be used in which the brakes of the trailer are mechanical and operable through a rod 60 connected to a lever 61 pivoted as at 62 to a tongue 10', identical with that at 10. The rod 47' corresponds to that at 47 and is pivotally connected at 63 to the lever 61. Otherwise the form of Figure 7 corresponds to the preceding form and the motion of the body 20 instead of being applied to the plunger 17, will be applied to the lever 61 and through the same to the rod 60 which applies the brakes.

Various changes may be resorted to provided they fall within the spirit and scope of the invention.

I claim as my invention:—

1. In combination, a tongue attachable to a trailer, a body movable on the tongue attachable to a draft vehicle, brake applying mechanism for a trailer, means to operate the latter mechanism through movement of the body relatively to the tongue incident to application of the brakes of a draft vehicle, said body having elongated slots, axles on the tongue extending through the slots, said body having flanges, wheels on the axles engaged by the flanges, said tongue having an elongated slot, a stud extending through said slot, a push rod for the brake-applying means carried by the stud.

2. In combination, a tongue attachable to a trailer, a body movable on the tongue attachable to a draft vehicle, brake applying mechanism for a trailer, means to operate the latter mechanism through movement of the body relatively to the tongue incident to application of the brakes of a draft vehicle, said body having elongated slots, axles on the tongue extending through the slots, said body having flanges, wheels on the axles engaged by the flanges, said tongue having a slot in its lower wall, means extending from the latter slot provided with a ball, a clamp engageable with the ball and with a draft vehicle, said tongue comprising U-shaped beams, blocks and bolts securing the beams together, one of the blocks having a depending lug provided with an opening, a rod pivoted to the body and extending through the latter opening, and an expansive spring engaging said lug and a part on said rod and surrounding said rod.

3. In combination, a tongue attachable to a trailer, a body movable within the tongue attachable to a draft vehicle, brake applying mechanism for a trailer, means to operate the latter mechanism through movement of the body relatively to the tongue incident to application of the brakes of a draft vehicle, shaft means within the tongue, roller means mounted by the shaft means, said body being slotted for passage of the shaft means therethrough, said body having continuous flange means thereon engaged with said roller means.

AMIL SANDUL.